United States Patent [19]

Gavrieli

[11] Patent Number: 4,861,090

[45] Date of Patent: Aug. 29, 1989

[54] FAN-TYPE AUTOMOBILE WINDOW SHADE

[76] Inventor: Haviv Gavrieli, 7943 Haskell Ave 1, Van Nuys, Calif. 91406

[21] Appl. No.: 25,363

[22] Filed: Mar. 13, 1987

[51] Int. Cl.⁴ .................................................. B60J 3/02
[52] U.S. Cl. .................................... 160/134; 160/370.2
[58] Field of Search ................ 296/97 G, 97 D, 97 R; 160/DIG. 3, 134

[56] References Cited

U.S. PATENT DOCUMENTS

| | | | |
|---|---|---|---|
| 2,560,762 | 7/1951 | Ghegan | 296/97 G |
| 3,021,173 | 2/1962 | Levin | 296/97 G |
| 3,649,069 | 3/1972 | Zip | 296/97 G |
| 4,332,414 | 6/1982 | Surtin | 296/97 G |
| 4,606,572 | 8/1986 | Maguire | 296/97 D |
| 4,681,149 | 7/1987 | Tung-chow | 296/97 D |

Primary Examiner—Robert R. Song
Attorney, Agent, or Firm—Erik M. Arnhem

[57] ABSTRACT

A fan-type sunshade for protecting the interior of a vehicle against light radiation can be placed on the dashboard in the vehicle in close proximity to the windshield. The sunshade substantially covers the windshield in a single or mono-plane manner. The shade comprises a support by means of which it can be placed on the dashboard of a vehicle between a windshield and a driver but in close proximity to the windshield. The shade further comprises a plurality of slats connected at the support, with the slats being arranged in a first array and a second array, whereby the first array and the second array abut one another in the extended operative position at a common interface plane without creating an overlap and the two arrays are connected in the extended operative position. The support can be enhanced by suction cups for attachment to a windshield.

9 Claims, 3 Drawing Sheets

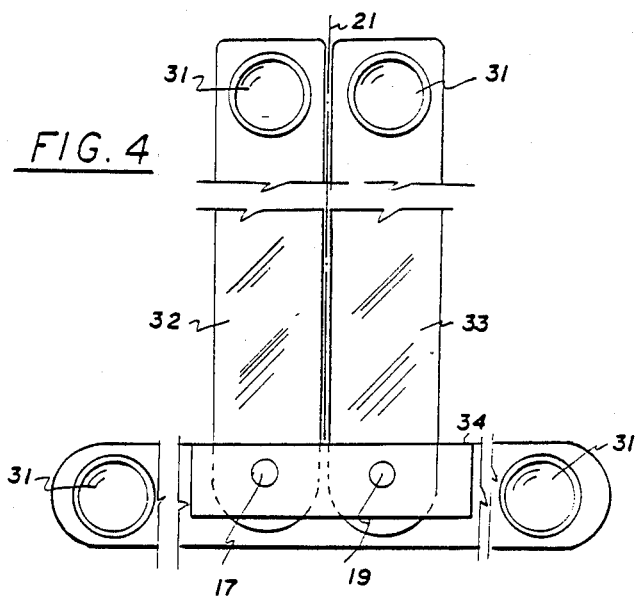
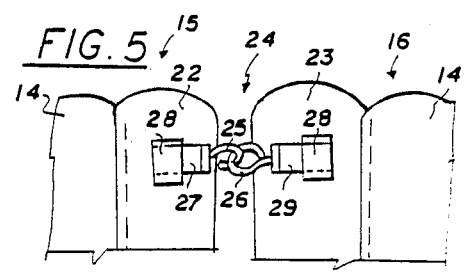

FAN-TYPE AUTOMOBILE WINDOW SHADE

BACKGROUND OF THE INVENTION (1) Field of the Invention

My invention is concerned with an improved fan-type automobile windshield shade, and more particularly my invention relates to a folding fan-type window shade which can be mounted on the interior dashboard of an automobile in close proximity adjacent the windshield thereof to alleviate sun and heat radiation.

(2) Prior Art

Numerous proposals have been made in the prior art to shield the interior of a vehicle against the light passing through the forward window or windshield and reduce the associated temperature increase in the vehicle. Such precautions will enhance the efficiency of operation due to decreased use of the air-conditioning equipment present in many cars, as well as to maintain the interior of the vehicle in a better condition than if it were repeatedly subjected to numerous fluctuations in temperature and excessive heat.

In accordance with U.S. Pat. No. 4,606,572 issued Aug. 19, 1986, naming Paul R. Maguire as inventor, an automobile sunshade is comprised of a plurality of elongated blades pinned together at one end. The blades are provided with a plurality of openings intermediate the ends thereof. A joinder tape is woven through the openings in each blade to permit the blades to be opened in a fan-like manner in either direction, or to be folded to occupy the space of a single blade.

Maguire teaches a number of blades or slat members, each defining a slot centrally located with respect to the edges of the member and intermediate the ends thereof and a pair of passageways on each side of the central slot. The joinder ribbon according to Maguire is secured to the members within the central slot and passageways, with the ribbon passing from a front face of the blade through the central slot to the rear of the blade, then through the passageway nearest the central slot on one side of the blade back, through the passageway near the outer edge on said one side to the rear face of the blade, back through the central slot to the front face of the blade, then through the passageway near the outer edge on the other side of the slot to the rear face back through the passageway nearest the central slot on said other side of the slot to the front face, then back through the central slot to the rear face, and then on to the front face of the next adjacent blade or slat member.

U.S. Pat. No. 4,332,414 issued June 1, 1982 to Robert J. Surtin is concerned with an automobile window shade wherein a plurality of elongated members are pivotally joined together proximate one end thereof and disposed in stacked relationship to each other and are further provided with a joinder tape which passes through and is secured to each member intermediate its ends and a mounting bracket operably mounted to the elongated members The tape retains the members in fixed predetermined open relationship.

Surtin in particular is addressing the manner of joining the slat members by providing each member with four apertures, the first three apertures being equally spaced in a group adjacent to one longitudinal edge of the member and the fourth aperture is spaced from the group of three across the width of the member. All the apertures according to the sunshade or shield of Maguire are disposed in a row across the width of the member and the respective joinder tape is disposed in the apertures in such a way that the joinder tape passes from a first side of the member through the fourth aperture to the second side of the member, through the next adjacent aperture to the first side and then, skipping the next successive aperture, through the first aperture to the second side, then through the second aperture to the first side, through the third aperture to the second side, and to the first side of the next adjacent elongated slat member.

U.S. Pat. No. 3,021,173 issued Feb. 13, 1962 to L. Levin is concerned with a solenoid driven shield which can be moved between a retracted inoperative position and an extended operative position to then be disposed in the line of vision of a vehicle driver and the windshield.

U.S. Pat. No. 2,560,762 of July 17, 1951 to J. A. Ghegan is concerned with a sunshade at the steering column which will protect the legs, thighs and abdomen of the driver of a motor vehicle, with the sunshade including blades interconnected to one another by pin and slot formations, and a set of these shades is provided on each side of the steering wheel column.

A similar proposal is contained in the U.S. Pat. No. 1,613,364 issued Jan. 4, 1927 to J. M. Thompson and relating to a particular configuration of the blades to reduce overlapping areas to a minimum.

U.S. Pat. No. 1,510,984 of Oct. 7, 1924 to J. C. Dorsey and J. W. Vaughn is concerned with a fan-type glare dimmer which can be mounted at the upper bar of the windshield.

Other prior art proposals to shield or shade the windshield of vehicles include those of U.S. Pat. Nos. 4,248,473 for a sunshade auxiliary device, or extender of the customary vehicle sun visor; 4,202,396 for a folding-expandible sheet; 4,109,957 for a windshield curtain; 4,005,899 for a zig-zag antiglare shield; 3,880,461 for a substantially solid composition board faced on one side with a non-glare reflective material; 3,003,812 for a jalousie-type shade; 2,855,241 for a rollable sun visor with a plurality of separately movable sections; 2,651,543 for a substantially rigid reflector; and 2,519,222 for a pivotally mounted rigid glare eliminator.

Although the prior art contains extensive teachings as to various configurations of sunshades or shields, and particularly Maguire and Surtin have shown in particular ways to connect slat elements of a fan-type sun shade, there has remained, however, the need for an improved and effectively shielding sunshade.

SUMMARY OF THE INVENTION

In accordance with our invention there is provided a fan-type shade for protecting the interior of a vehicle against light radiation by being placed on the dashboard in the car in close proximity to the windshield, said sunshade comprising a fan-type shade which substantially covers the windshield area in a single plane.

The shade of my invention includes means for supporting the shade on the dashboard of an automobile between a windshield and a driver but in close proximity to the windshield and substantially covering the windshield in a continuous single plane.

The sunshade generally includes a plurality of flat elongated slats connected to said supporting means, said plurality of slats being arranged in a first array and a second array, with the members of said first array being connected at a first pivot point and being arranged to be opened in fan-like manner, and adapted to be folded to occupy substantially the space of a single blade at said base. The members of second array are also connected at a respective second pivot point and being arranged so as to be opened in fan-like manner and folded to occupy substantially the space of a single blade at said base. More particularly, said first array and said second array abut one another in the extended operative position at a common interface plane without creating an overlap.

Furthermore, the sunshade includes means for connecting said first array and said second array in the extended operative position.

The sunshade can be attached to the car's windshield by way of several suction cup means or suction cups, which form part of the support structure of the shade.

In accordance with a preferred embodiment, the sunshade assembly has a support which includes a first base for said first array of elongate elements, and a second base for said second array, as well as bracket means for connecting said first base and said second base at the interface of said first and second arrays in the operative position.

It is also preferred that the bracket means includes a pivotable mounted support arm adapted to extend perpendicularly with respect to the major plane of said shade when said first and second arrays are in the extended operative position.

The slats or elements which in assembly form the sunshade can be matched in color to the color of a car.

Included in the objects of my invention are:

To provide a sunshade which is easily mounted on the interior dashboard of a car or other similar vehicle.

To provide a sunshade which is easily opened and closed.

To provide a sunshade which effectively covers the full area of a windshield at which it is used.

To provide a sunshade which is economical in structure and manufacture.

DESCRIPTION OF THE DRAWINGS

The foregoing and other objects, features and advantages will become apparent from the following description, reference being made to the accompanying drawing in which:

FIG. 4 is an elevational view of the sunshade in the closed condition from the rear of the base thereof;

FIG. 5 is a view showing the connection of the two halves;

SPECIFIC DESCRIPTION

Figure 1:
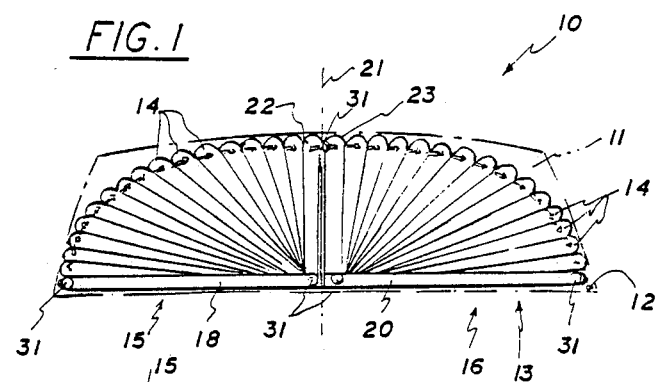
FIG. 1 is an elevational view of the sunshade with both halves shown in the open or operative position against the windshield of a vehicle.

The fan-type shade of my invention is generally identified by reference numeral 10, and in FIG. 1 it is shown in the open or operative position in which it is placed against a windshield 11 of a car or similar vehicle. The windshield 11 is only schematically outlined, and it will be understood that my shade can be readily used with the various types of windows of cars and similar vehicles.

The sunshade 10 is supported on the dashboard 12 (only schematically indicated) and the respective support means 13 can position the shade 10 on the dashboard 12 of an automobile between the windshield 11 and a driver, but in such a way that it is in close proximity with respect to the windshield 11.

The sunshade 10 is comprised of a plurality of slats or similar elongate elements, hereinafter also referred to as sunshade members and which are generally identified by reference numeral 14. The sunshade members 14 are connected to the support 13 in a particular manner. Thus, the sunshade 10 is comprised of a first array (15) and a second array (16) of sunshade members 14.

Figure 2:
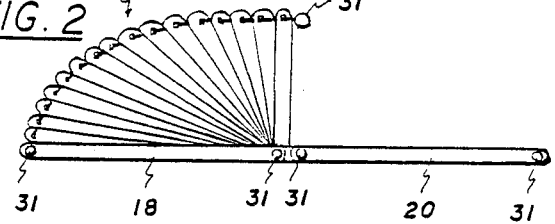
FIG. 2 is an elevational view of the sunshade showing the left shade in the open and the right shade in the closed condition.
Figure 3:
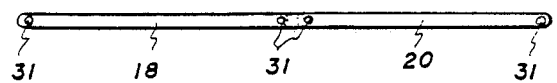
FIG. 3 is an elevational view of the sunshade showing both halves in the closed condition.

The first array 15 of sunshade members 14 is shown in the fully open condition in FIGS. 1 and 2, and it is pivotally joined at the pivot pin 17 and can be opened or fanned-out to occupy the left side of the windshield 11 as shown in FIG. 2. The first array 15 of sunshade members 14 can be collapsed or folded together to occupy the area behind the first or base slat or member 18. Similarly, the second array 16 of sunslat shade members 14 is pivotally joined at the pivot pin 19 and it can be opened or fanned-out to occupy the right side of the windshield 11. The second array 16 of sunshade members 14 can also be collapsed or folded to occupy the area behind its respective first or base slat 20. The base slats 18 and 20 are supported within base members 32 and 33 respectively and are secured thereto by conventional fastening means.

As shown in FIG. 1, the first array 15 and the second array 16 abut one another in the extended or operative position at the common interface plane 21 of the last or connection slat 22 of the first array 15 and the respective last or connection slat 23 of the second array 16. The connection, to be described in detail below, is such that the respective slats edges closely abut, but they do not overlap. Accordingly, a uniform cover of the windshield 11 is achieved by the unfolded shade 10.

With reference to FIG. 5, the means for connecting the first array 15 of sunshade members or slats 14 and the second array 16 in the extended operative position is generally designated by reference numeral 24, and it includes a hook element 25 and a receiving ring element 26. The hook element 25 is fastened to the strap 27 which serves to guide the sunshade members 14 during opening of the first array 15, and serves to gather the sunshade members 14 of the first array 15 when the array 15 is collapsed or folded together, by passing through respective passages 28 in the members 14. The receiving ring element 26, in turn, is fastened to the strap 29 which serves to guide and gather the shade members 14 of the second array 16. Accordingly, a simple and effective connection, and covering of the windshield area 11, is achieved by hooking the hook element 25 in the receiving ring element 26. Of course, in the connected condition, the straps 27 and 29 will be taut and they will retain the shade 10 in substantially rigid and mono-planar manner with respect to the windshield 11.

For a very secure and positive securement of the sunshade 10 at the windshield 11, the support means 13 includes several suction cups 31 for attaching the shade 10 to a windshield.

Figure 7:
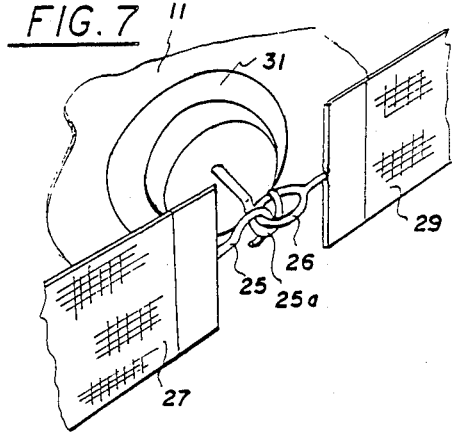
FIG. 7 is a perspective view showing the connection of the two shade halves at the windshield and with a suction cup.

Thus, reference to FIG. 1, the assembly includes five suction cups 31. One suction cup 31 (FIG. 7) may be specifically employed to attach the means (24) for connecting the first array 15 of sunshade members or slats 14 and the second array 16 in the extended operative position. This suction cup 31 has a hook element 25a at which can be attached the hook element 25 and the ring element 26. The hook element 25 is fastened to the strap 27 which serves to guide the sunshade members 14 during opening of the first array 15. The receiving ring element 26, in turn, is fastened to the strap 29 which serves to guide and gather the shade members 14 of the second array 16. Accordingly, again a simple and effective connection, and covering of the windshield area 11, is achieved by securing the hook element 25 and the ring element 26 at the hook element 25a.

Specifically, the shade 10 can have a base which includes a first base or base piece 32 formed of a generally U-shaped elongated member supporting two suction cups 31 at either end thereof for the first array 15 and a further, second base piece 33, also formed of a generally U-shaped elongated member supporting two suction cups 31 at either end for the second array 16. Suction cups 31 are secured to base members 32 and 33 by conventional rivets. In accordance with conventional fabrication methods, suctions cups 31 may alternatively be secured using adhesive or other fastening methods. The two base pieces 32 and 33 are joined by a central bracket 34 at the mentioned interface plane 21. Central bracket 34 comprises an elongated generally planar member supporting a pair of suction cups 31 at either end thereof and supporting a pair pivotal attachments 17 and 19 intermediate suction cups 31. The respective connections between the central bracket 34 and the two base pieces 32 and 33 are achieved by way of threaded fasteners, for example small screws and nuts as required. Of course, rivets or other means can be used.

Figure 6:
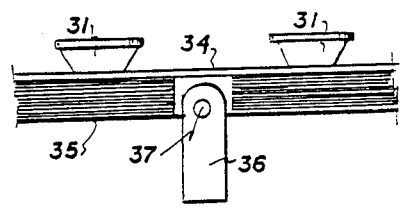
FIG. 6 is a top plan view of the shade at the interface of the two arrays of shade members.

FIG. 6 sets forth an alternate embodiment of the invention providing a very positive support for the shade 10, in which the central bracket 34 includes a leg portion 35 at which is fastened a pivotably mounted support arm 36 which can be turned with respect to a pivot element 37, for example, a rivet or small threaded fasteners so as to be extended perpendicularly with respect to the major plane of the sunshade 10 when the first (15) and second (16) arrays are in the extended and operative position. Conversely, the support arm 36 can be folded to be aligned with and against the leg portion 35 of the central bracket 34.

As well, the two base pieces 32 and 33 can be folded together as indicated in FIG. 4 for convenient space-saving storage of the shade 10.

The slats or shade members 14 can be made of any suitable material, and they may be of a color which matches with, or which accents, the color of the vehicle in which it is used.

Thus, my invention is concerned with a fan-type shade 10 for use between a driver and a windshield 11, but in close proximity to a respective windshield. The shade 10 comprises the combination of a first base member or base piece 32, which accommodates at its first end a pivot pin 17 about which a plurality of shade members 14 of a first array 15 can pivot or turn to unfold and collapse for respectively covering and uncovering the windshield 11, said first base piece also having a second, attachment end remote from its pivot end for attaching it to the windshield 11 by means of a suction cup 31. The shade assembly also comprises a second base member or piece 33 which is mounted at a pivot pin 19 by its first, pivot end, about which pivot pin 19 a plurality of shade members 14 of a second array 16 can pivot or turn to unfold and collapse for respectively covering and uncovering the balance of the windshield 11. The second base member or piece 33 also has a second, attachment end remote from its pivot end for attaching it to the windshield 11 by means of a suction cup 31.

The shade members 14 of each array (15, 16) are connected to a respective support base (32, 33) as aforesaid, whereby in the position in which they fully cover the window 11, the first array 15 and the second array 16 abut one another at a common interface plane 21 without creating an overlap.

The two base pieces (32, 33) for supporting the shade 10 on the dashboard 12 of an automobile between a windshield and a driver but in close proximity to the windshield 11 can be folded by being connected by the central bracket 34.

The two arrays (15, 16) can be readily connected in their extended operative position by the connecting means 24 comprised of the hook element 25 and the receiving ring element 26, respectively fastened to the strap 27 of the first array 15 and the strap 29 for the shade members 14 of the second array 16.

It will be understood that the embodiment illustrated in the aforesaid is merely used for describing the present invention, but not as limiting the present invention. Any structure or apparatus made with or without minor modifications but not deviating from the spirit, concept and features of the present invention is deemed as being included in the scope of the claims of my invention.

I claim:

1. A fan-type sunshade for protecting the interior of a vehicle against light radiation by being placed on the dashboard in the vehicle in close proximity to the windshield, said sunshade comprising fan-type shade sections which substantially cover the windshield area in a single plane;

supporting means; a first and second plurality of slats connected to said supporting means said first plurality of slats being arranged in a first array characterized by a first fan-like arrangement in which said first plurality of slats are serially arranged in a parallel closed position and are sequentially extended to an operative position in which one of said slats in said first plurality of slats is maximally extended and a second array characterized by a second fan-like arrangement in which second plurality of slats are serially arranged in a parallel closed position and are sequentially extended to an operative position in which one of said slats in said second plurality of slats is maximally extended, whereby said maximally extended slats in said first and second pluralities of slats each define edges which abut one another in the extended operative position at a common interface plane without creating an overlap; and means for connecting said first array and said array in the extended operative position.

2. The shade as defined in claim 1 wherein said support means includes suction cup means for attaching it to a windshield.

3. The shade as defined in claim 1 wherein said support means includes at least five suction cups.

4. The shade as defined in claim 1 wherein said connecting means is secured to a respective suction cup.

5. The shade as defined in claim 1 wherein said support means includes a first base for said first array, a second base for said second array, and bracket means for connecting said first base and said second base at said interface plane.

6. The shade as defined in claim 5 wherein said bracket means includes a pivotable mounted support arm adapted to extend perpendicularly when viewed in plan with respect to the major plane of said shade when said first and second arrays are in the extended operative position.

7. The shade as defined in claim 1 wherein said plurality of slats is matched in color to the color of a car.

8. A fan-type shade for use between a driver and a windshield but in close proximity to a respective windshield, said shade comprising in combination:
   a first base member, said first base member having a first, pivot end and a second, attachment end remote from its pivot end;
   a second base member having a first, pivot end and a second, attachment end remote from its pivot end;
   a first plurality of slats connected to said first base member, said first plurality of slats being arranged in a first array whereby said first array may be extended to an operative position in which one of said slats in said first plurality of slats defines a first common edge interface;
   a second plurality of slats connected to said second base member, said second plurality of slats being arranged in a second array, whereby said second array may be extended to an operative position in which one of said slats in said second plurality of slats defines a second common edge interface; and
   means for connecting said first array and said second array in the extended operative position such that said first and second common edge interfaces abut without overlap.

9. The sunshade of claim 1 wherein said means for connecting the first array and the second array in the extended operative position includes a hook element and a receiving ring element.

* * * * *